(12) United States Patent
Lenický et al.

(10) Patent No.: US 11,629,837 B2
(45) Date of Patent: Apr. 18, 2023

(54) LIGHTING ARRANGEMENT FOR VEHICLES

(71) Applicant: ZKW Group GmbH, Wieselburg (AT)

(72) Inventors: Viktor Lenický, Galanta (SK); Jozef Manduch, Tovarniky (SK); Milos Siska, Topol'cany (SK)

(73) Assignee: ZKW Group GmbH, Wieselburg (AT)

( * ) Notice: Subject to any disclaimer, the term of this patent is extended or adjusted under 35 U.S.C. 154(b) by 109 days.

(21) Appl. No.: 17/421,856

(22) PCT Filed: Dec. 12, 2019

(86) PCT No.: PCT/EP2019/084798
§ 371 (c)(1),
(2) Date: Jul. 9, 2021

(87) PCT Pub. No.: WO2020/148035
PCT Pub. Date: Jul. 23, 2020

(65) Prior Publication Data
US 2022/0107075 A1 Apr. 7, 2022

(30) Foreign Application Priority Data
Jan. 18, 2019 (EP) .................................... 19152529

(51) Int. Cl.
*F21Y 115/10* (2016.01)
*F21S 43/237* (2018.01)
(Continued)

(52) U.S. Cl.
CPC .......... *F21S 43/237* (2018.01); *B60Q 1/0052* (2013.01); *F21S 43/241* (2018.01);
(Continued)

(58) Field of Classification Search
CPC ........ F21S 41/24; F21S 43/245; F21S 43/237; G02B 6/0006; B60Q 1/0011; B60Q 1/04; B60Q 1/0052
See application file for complete search history.

(56) References Cited

U.S. PATENT DOCUMENTS 5,555,161 A * 9/1996 Roe .......................... F16H 63/42
362/555
6,107,916 A * 8/2000 Beck ...................... F21S 43/237
340/472

(Continued)

FOREIGN PATENT DOCUMENTS

| EP | 2620790 A1 | 7/2013 |
| EP | 3205926 A1 | 8/2017 |
| JP | 2015204275 A | 11/2015 |

OTHER PUBLICATIONS

International Search Report for PCT/EP2019/084798, dated Mar. 13, 2020 (12 pages).

(Continued)

*Primary Examiner* — Eric T Eide
(74) *Attorney, Agent, or Firm* — Eversheds Sutherland (US) LLP

(57) ABSTRACT

Lighting arrangement (10) for vehicles, said light arrangement comprises: —at least one light guide (100), which extends from a common end region (110) into a at least one light guide portion (210) at a transition section (200) of the light guide (100), wherein the common end region (110) has a light main propagation direction (X) and the at least one light guide portion (210) extends along a second direction, wherein the at least one light guide (100) comprises a light receiving surface (101) configured to receive light from a light source and direct the light into the light guide (100), wherein the at least one light guide portion (210) has one or more decoupling-elements (230) for emitting light out of the (Continued)

Figure 1:
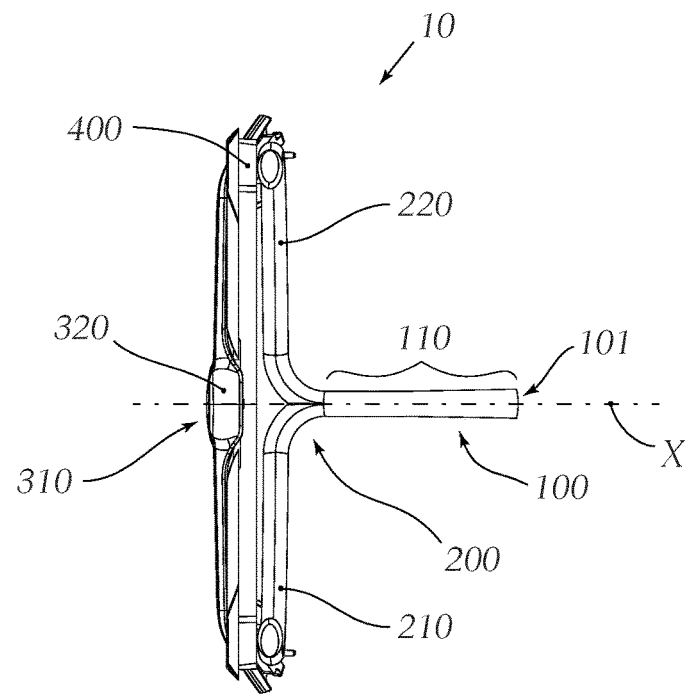

light guide portion (210), wherein the at least one light guide portion (210) is configured to emit a first light distribution, and —a supplementary component (300) for using stray light exiting from the at least one light guide (100) at the transition section (200), said supplementary component (300) extends along the transition section (200) and has a light entry surface and a light exit surface opposite to the light entry surface for emitting light in the main propagation direction (X).

11 Claims, 2 Drawing Sheets

(51) Int. Cl.
*F21S 43/247* (2018.01)
*F21S 43/245* (2018.01)
*F21S 43/241* (2018.01)
*B60Q 1/00* (2006.01)

(52) U.S. Cl.
CPC ........... *F21S 43/245* (2018.01); *F21S 43/247* (2018.01); *F21Y 2115/10* (2016.08)

(56) References Cited

U.S. PATENT DOCUMENTS

| | | | | |
|---|---|---|---|---|
| 6,789,929 | B1* | 9/2004 | Doong | F21V 7/0091 362/543 |
| 7,290,906 | B2* | 11/2007 | Suzuki | F21S 43/26 362/612 |
| 7,726,862 | B2* | 6/2010 | Lin | G02B 6/0011 362/555 |
| 9,242,594 | B2* | 1/2016 | Nakada | B60Q 1/0058 |
| 9,340,149 | B2* | 5/2016 | Domini | F21S 43/40 |
| 10,017,101 | B2* | 7/2018 | Herbin | F21S 43/245 |
| 10,260,704 | B2* | 4/2019 | Yamada | F21S 43/245 |
| 10,371,341 | B2* | 8/2019 | Hanami | F21S 43/241 |
| 10,718,481 | B2* | 7/2020 | Nakaya | F21S 41/24 |
| 11,002,420 | B2* | 5/2021 | Dey | F21S 41/24 |
| 11,021,202 | B2* | 6/2021 | Tanaka | F21S 43/241 |
| 2008/0049447 | A1* | 2/2008 | Jung | G09F 15/0081 362/612 |
| 2013/0114277 | A1* | 5/2013 | Faffelberger | F21S 43/247 362/235 |

OTHER PUBLICATIONS

Search Report for European Patent Application No. 19152529.4, dated Aug. 1, 2019 (7 pages).

* cited by examiner

LIGHTING ARRANGEMENT FOR VEHICLES

The invention relates to a lighting arrangement for vehicles.

Lighting arrangements are increasingly used in vehicle construction, wherein light originating from light sources is fed to a front surface in a light guide or light rod. The light of the light source is totally reflected inside the boundary walls of the most circular, but possibly also another, e. g. elliptical cross-section of the light guide, but the light is emitted at the impurities and substantially at the opposite side of the impurity. The geometry of the light guides is determined by design specifications in automotive construction, whereby the desired contours can often no longer be realized by a single light guide or light rod and it is often necessary to subdivide a light guide into two branches. Occasionally, the requirements could be fulfilled only by splitting into two separate functions, performed by several stand-alone light guides.

In the lighting arrangements according to the prior art, problems arise with respect to a uniform luminance along the light guide, especially at the fork section, wherein unwanted light spots occur depending on the viewing angle.

It is an object of the invention to provide an enhanced lighting arrangement.

To achieve this object, the lighting arrangement of the initially mentioned kind comprises:

- at least one light guide, which extends from a common end region into at least one light guide portion at a transition section of the light guide, wherein the common end region has a light main propagation direction and the at least one light guide portion extends along a second direction, wherein the at least one light guide comprises a light receiving surface configured to receive light from a light source and direct the light into the light guide, wherein the at least one light guide portion has one or more decoupling elements for emitting light out of the light guide portion, wherein the at least one light guide portion is configured to emit a first light distribution, and
- a supplementary component for using stray light exiting from the at least one light guide at the transition section, said supplementary component extends along the transition section and has a light entry surface and a light exit surface opposite to the light entry surface for emitting light in the main propagation direction.

The second direction differs from the main propagation direction.

Stray light occurs when the light guide has a curvature with a certain radius, so that total internal reflection of received light is no longer present.

Advantageously, the at least one light guide extends from the common end region into a fork section, wherein at the fork section the light guide branches into at least two light guide portions.

In other words, the transition section is built as a fork section where the light guide extends into at least two guide portions.

Advantageously, the light entry surface of the supplementary component is oriented orthogonal to the main propagation direction of the common end region.

Usually, the fork section of such a light guide is covered with an opaque covering element, so that the stray light emerging from the fork section does not disturb the first light distribution, there is no effect to light guide homogeneity. However, in the present invention, the unavoidable and unwanted stray light at the fork section is effectively utilized to illuminate, for example a logo. As a result, no additional light source or the like is necessary because the light used for illuminating the logo comes from the fork section as a stray light.

Thanks to the features of the invention, a lighting arrangement is provided which allows both the emission of a homogeneous light image with additional logo illumination and also can be easily manufactured.

By providing a supplementary component whose light entrance surface is oriented orthogonal to the light main propagation direction and which is spaced from the fork section, the stray light emerging from the fork section can propagate toward the supplementary component, the light passing through the light entry surface of the supplementary component, propagates within the supplementary component, at least partially merges and exits through the light exit surface of the supplementary component.

As a result, stray light emerging from the fork section can be used in a simple manner.

This arrangement does not require a shape-filling adaptation of the geometric shape of the supplementary component to the fork section of the light guide, so that an air space can remain between the fork section or the beam-splitting point, located at a vertex of the fork section or crotch, and the supplementary component. The supplementary component is therefore subject to lower manufacturing tolerances and can therefore be inexpensively introduced between the light guide sections. The lighting arrangement according to the invention does not necessarily have to comprise only a single supplementary component. The supplementary component may also be formed in several pieces.

The term "beam splitting point located at a vertex of the crotch" is understood to mean the point—seen from the main propagation direction, which is the last point at which the light guide portions are in contact in a cross-sectional view oriented orthogonal to the light main propagation direction, so that stray light can exit therefrom.

Thanks to the invention the light in the critical fork section can be used for illuminating for example a logo, where one has in hand to control the brightness or the amount of stray light exiting the light guide portions at the fork section over the diameter, more generally on the geometry of the fork section according to the specifications.

Clamping means can be provided for easy attachment of the supplementary component to the light guide or a light guide portion, so that the supplementary component is connected to the light guide or to a light guide portion.

Advantageously, the light guide has exactly two light guide portions branched to one another.

Advantageously, the light guide is arranged horizontally or in a virtual horizontal plane, wherein the two light guide portions extend both in a virtual vertical plane orthogonal to the virtual horizontal plane.

It can be provided, that the two light guide portions follow a circular path, preferably in a virtual vertical plane.

Advantageously, the light exit surface of the supplementary component is parallel to the light entry surface of the supplementary component.

Advantageously, the at least one light guide portion has at least one continuous strip of juxtaposed decoupling-elements, said strip extending along the longitudinal extent of the respective light guide portions to the fork section.

Advantageously, the supplementary component comprises a translucent section surrounded by an opaque cover section.

Advantageously, the translucent section is formed as a logo.

Advantageously, the translucent section comprises a graphic symbol. This symbol will also be illuminated by the stray light. Therefore, this graphic symbol can be seen in a dark surrounding, e.g. by night.

The graphic symbol can also be formed as a logo e.g. an emblem of a vehicle manufacturer.

Advantageously, the translucent section of the supplementary component comprises at least two parts with distinct colors, which can be plugged together and forming the graphic symbol.

Advantageously, the opaque section comprises an opening, wherein the translucent section is arranged in the opening of the opaque section.

Advantageously, the lighting arrangement comprises a thick wall arranged between the light guide portions and the supplementary component.

Advantageously, the thick wall extends along the light guide portions and is configured to homogenize the first light distribution emitted by the light guide portions.

Advantageously, the at least one light source is an LED.

Advantageously, the first and second light distribution are distinct from one another.

So, the supplementary component is not used for homogenize the first light distribution of the light guide portions, or the like.

The object can also be achieved by a vehicle headlamp with at least one lighting arrangement according to the invention.

The object can also be achieved by a vehicle with at least one lighting arrangement and/or with at least one vehicle headlamp according to the invention.

Figure 2:
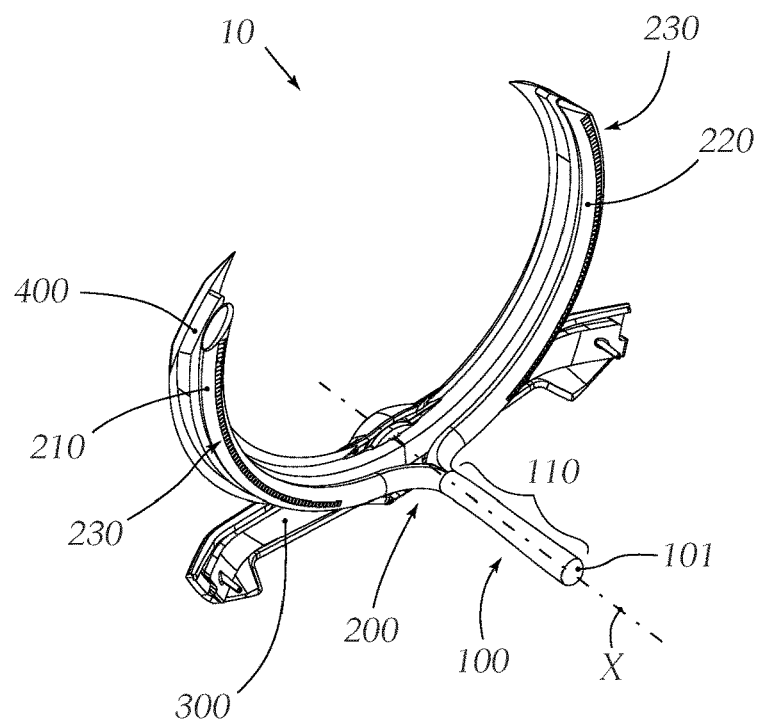
Figure 3:
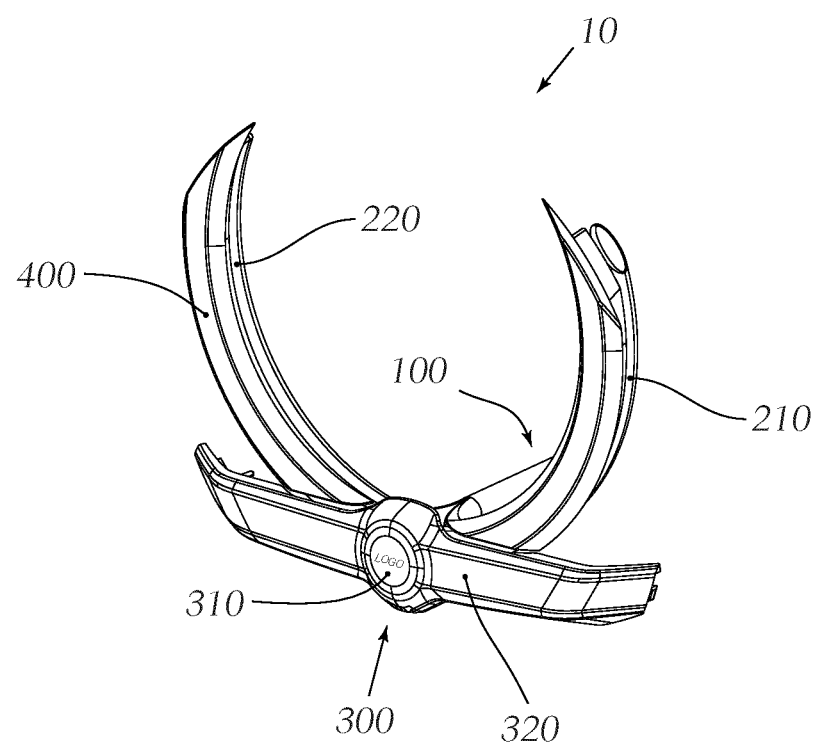

In the following, in order to further demonstrate the present invention, illustrative and non-restrictive embodiments are discussed, as shown in the drawings, which show:

FIG. 1 a top view of an illustrative lighting arrangement, comprising a light guide with two light guide portions, a thick wall and supplementary component with a translucent logo, FIG. 2 a perspective back view of the lighting arrangement of FIG. 1, and FIG. 3 a perspective front view of the lighting arrangement of FIG. 1.

FIG. 1 shows a lighting arrangement 10 for vehicles, said lighting arrangement comprising a light guide 100, which extends from a common end region 110 into a fork section 200, wherein the light guide 100 branches into two light guide portions 210, 220 at the determined angle, in this case 90 degrees, wherein the common end region 110 has a light main propagation direction X.

The light guide 100 comprises a light receiving surface 101 configured to receive light from a light source (not shown), i.e. an LED, and directing the light into the light guide 100, wherein each light guide portions 210, 220 has one continuous strip of juxtaposed decoupling elements 230 for emitting light out of the light guide portions 210, 220, as can be seen in FIG. 2. Said strip extending along the longitudinal extent of the respective light guide portions 210, 220 to the fork section 200, and wherein the light guide portions 210, 220 are configured to emit a first light distribution.

The light guide 100 is arranged horizontally or in a virtual horizontal plane, wherein the two light guide portions 210, 220 extend both in a virtual vertical plane orthogonal to the virtual horizontal plane, wherein the two light guide portions 210, 220 follow a circular path in the virtual vertical plane.

The lighting arrangement 10 further comprises a supplementary component 300 for using stray light exiting from the at least one light guide 100 at the fork section 200, said supplementary component 300 extends along the fork section 200 and has a light entry surface and a light exit surface opposite to the light entry surface for emitting light in the main propagation direction X. The supplementary component 300 is configured to emit a second light distribution, which is distinct from the first light distribution, wherein the light entry surface is oriented orthogonal to the main propagation direction X of the common end region 110 and the light exit surface is parallel to the light entry surface of the supplementary component 300.

Further, the supplementary component 300 has a translucent section 310 having the light entry surface and the light exit surface, said translucent section 310, which can be formed as a logo, is surrounded by an opaque cover section 320, as can be seen in FIG. 3.

Furthermore, a thick wall 400 is arranged between the light guide portions 210, 220 and the supplementary component 300, said thick wall 400 extends along the light guide portions 210, 220 and is configured to homogenize the first light distribution emitted by the light guide portions 210, 220.

LIST OF REFERENCE SIGNS

Lighting arrangement . . . 10
Light guide . . . 100
Light receiving surface . . . 101
Common end region . . . 110
Fork section . . . 200
Light guide portions . . . 210, 220
Decoupling elements . . . 230
Supplementary component . . . 300
Translucent section . . . 310
Opaque cover section . . . 320
Thick wall . . . 400

The invention claimed is:

1. A lighting arrangement (10) for vehicles, the lighting arrangement comprising:
at least one light guide (100), which extends from a common end region (110) into at least one light guide portion (210) at a transition section (200) of the at least one light guide (100), wherein the common end region (110) has a light main propagation direction (X) and the at least one light guide portion (210) extends along a second direction, wherein the at least one light guide (100) comprises a light receiving surface (101) configured to receive light from a light source and direct the light into the at least one light guide (100), wherein the at least one light guide portion (210) has one or more decoupling elements (230) for emitting light out of the at least one light guide portion (210), wherein the at least one light guide portion (210) is configured to emit a first light distribution; and
a supplementary component (300) for using stray light exiting from the at least one light guide (100) at the transition section (200), wherein the supplementary component (300) extends along the transition section (200) and has a light entry surface and a light exit surface opposite to the light entry surface for emitting light in the main propagation direction (X);
wherein the supplementary component (300) comprises a translucent section (310) formed as a logo.

2. The lighting arrangement according to claim 1, wherein the at least one light guide (100) extends from the common end region (110) into a fork section (200), wherein at the fork section the light guide (100) branches into at least two light guide portions (210, 220).

3. The lighting arrangement according to claim 1, wherein the light entry surface of the supplementary component (300) is oriented orthogonal to the main propagation direction (X) of the common end region (110).

4. The lighting arrangement according to claim 1, wherein the at least one light guide portion (210) has at least one continuous strip of juxtaposed decoupling elements (230), said strip extending along the longitudinal extent of the light guide portion (210) to the transition section (200).

5. The lighting arrangement according to claim 1, wherein the supplementary component (300) comprises the translucent section (310) surrounded by an opaque cover section (320).

6. The lighting arrangement according to claim 5, wherein the opaque cover section (320) comprises an opening, wherein the translucent section (310) is arranged in the opening of the opaque section (320).

7. The lighting arrangement according to claim 6, wherein a thick wall (400) extends along the light guide portions (210, 220) and is configured to homogenize the first light distribution emitted by the light guide portions (210, 220).

8. The lighting arrangement according to claim 1, wherein the at least one light source is a LED.

9. The lighting arrangement according to claim 1, wherein the first and second light distribution are distinct from one another.

10. A vehicle headlamp comprising at least one lighting arrangement (10) according to claim 1.

11. A vehicle comprising at least one vehicle headlamp according to claim 10.

* * * * *